United States Patent
Chen et al.

(10) Patent No.: US 8,126,392 B2
(45) Date of Patent: Feb. 28, 2012

(54) SYSTEM AND METHOD FOR IMPLEMENTING A MULTI-RADIO WIRELESS NETWORK

(75) Inventors: Wei-Peng Chen, Santa Clara, CA (US); Chenxi Zhu, Gaithersburg, MD (US); Jonathan R. Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 11/668,135

(22) Filed: Jan. 29, 2007

(65) Prior Publication Data
US 2008/0045174 A1    Feb. 21, 2008

Related U.S. Application Data

(60) Provisional application No. 60/822,861, filed on Aug. 18, 2006.

(51) Int. Cl.
*H04B 3/36* (2006.01)
(52) U.S. Cl. .......... 455/7; 455/8; 455/10; 455/11.1; 455/13.3; 455/15; 455/16; 455/424; 370/315; 370/321; 370/324; 370/328; 370/329; 370/341; 370/342; 370/345; 370/347; 370/442
(58) Field of Classification Search .......... 455/424, 455/7, 8, 11.1, 13.3, 15, 9, 13.1, 16, 450, 455/10; 370/315, 501, 252, 321, 324, 328, 370/329, 330, 337, 338, 341, 342, 345, 347, 370/350, 431, 441, 442, 443
See application file for complete search history.

(56) References Cited

U.S. PATENT DOCUMENTS

| | | | | |
|---|---|---|---|---|
| 5,408,679 | A * | 4/1995 | Masuda | 455/11.1 |
| 6,718,160 | B2 * | 4/2004 | Schmutz | 455/11.1 |
| 6,895,218 | B2 * | 5/2005 | Yarkosky | 455/20 |
| 7,123,648 | B2 * | 10/2006 | Ogawa | 375/211 |
| 7,233,771 | B2 * | 6/2007 | Proctor et al. | 455/11.1 |
| 7,400,898 | B2 * | 7/2008 | Kang et al. | 455/518 |
| 7,466,985 | B1 * | 12/2008 | Handforth et al. | 455/454 |
| 7,720,020 | B2 * | 5/2010 | Larsson | 370/315 |
| 2001/0031621 | A1 * | 10/2001 | Schmutz | 455/7 |

(Continued)

FOREIGN PATENT DOCUMENTS
EP    1 501 215 A1    1/2005

(Continued)

OTHER PUBLICATIONS

Jain, et al., *Impact of Interference on Multi-hop Wireless Network Performance*, downloaded from http://research.microsoft.com/mesh/paper/interference.pdf (14 pages).

(Continued)

*Primary Examiner* — Olumide T Ajibade Akonai
(74) *Attorney, Agent, or Firm* — Baker Botts L.L.P.

(57) ABSTRACT

A system for implementing a multi-radio wireless network includes a plurality of endpoints wirelessly coupled to a relay station. The system also includes a base station wirelessly coupled to the relay station. The relay station includes a first radio operable to use a first channel to communicate with the base station. The relay station also includes a second radio operable to use a second channel to communicate with the plurality of endpoints. The relay station further includes a processor coupled to the first radio and the second radio. The processor is operable to relay data between the base station and the plurality of endpoints.

28 Claims, 2 Drawing Sheets

U.S. PATENT DOCUMENTS

| | | | |
|---|---|---|---|
| 2003/0104781 A1* | 6/2003 | Son | 455/22 |
| 2006/0046643 A1* | 3/2006 | Izumikawa et al. | 455/7 |
| 2006/0046644 A1* | 3/2006 | Chung et al. | 455/11.1 |
| 2006/0098614 A1 | 5/2006 | Moon et al. | |
| 2006/0153132 A1* | 7/2006 | Saito | 370/329 |
| 2006/0178106 A1* | 8/2006 | Utakouji et al. | 455/11.1 |
| 2006/0285505 A1* | 12/2006 | Cho et al. | 370/254 |
| 2007/0058577 A1* | 3/2007 | Rubin | 370/328 |
| 2007/0072604 A1* | 3/2007 | Wang | 455/428 |
| 2007/0230432 A1* | 10/2007 | Choi et al. | 370/347 |
| 2008/0031180 A1* | 2/2008 | Hsieh et al. | 370/315 |
| 2008/0031181 A1* | 2/2008 | Tsai et al. | 370/315 |
| 2008/0285499 A1* | 11/2008 | Zhang et al. | 370/315 |

FOREIGN PATENT DOCUMENTS

| | | |
|---|---|---|
| EP | 1 804 442 A1 | 7/2007 |
| KR | 07-264117 | 3/1994 |
| KR | 1020060058352 | 11/2004 |
| WO | WO 95/24783 A1 | 9/1995 |

OTHER PUBLICATIONS

IEEE 802.16 Presentation Submission Template (Rev. 8.3), downloaded from http://grouper.ieee.org/groups/802/16/relay/contrib/C80216j-06_004r1.pdf (14 pages).

Industrial Technology Research Institute, *802.16j MMR Mobile Multi-Hop Relay*, tmlin@itri.org.tw (21 pages), Jun. 1, 2006.

Letter from Paul Nikolich to Jodi Haasz at International Stds Programs and Governance re *P802.16j—Amendment to IEEE Standard for Local and Metropolitan Area Networks*—Part 16: Air Interface for Fixed and Mobile Broadband Wireless Access Systems—Multihop Relay Specification (4 pages), Mar. 31, 2006.

Puthenkulam, et al., *802.16e: A Mobile Broadband Wireless Standard*, Mobility Group, Copyright © 2005 Intel Corporation (29 pages).

IEEE 802 Tutorial: 802.16 Mobile Multihop Relay, *IEEE WirelessMAN 802.16*, (73 pages), Mar. 6, 2006.

*IEEE Standard for Local and Metropolitan area networks*, Part 16: Air Interface for Fixed and Mobile Broadband Wireless Access Systems, Amendment 2, and Corrigendum 1 IEEE Copyright © 2006 IEEE (822 pages).

Kipo's Notice of Preliminary Rejection (English Translation) Office Action for Korean Patent Application No. 10-2007-77442, 1 page, Feb. 18, 2009.

Korean Office Action for Korean Patent Application No. 10-2007-77442, 3 pages, Jan. 29, 2009.

Patent Abstracts of Japan, Publication No. 07-264117, Application No. 06-05834, filed Mar. 22, 1994 1 page, Published Oct. 13, 1995.

KIPO's Notice of Preliminary Rejection regarding Korean Patent Application. 10-2007-74180, mailed Apr. 14, 2009.

Ralf Pabst et al., "Relay-Based Deployment Concepts for Wireless and Mobile Broadband Radio," *Wireless World Research Forum*, XP-002609720, *IEEE Communications Magazine*, Sep. 2004 (pp. 80-89).

EPO Communication, European Search Report, dated Dec. 2, 2010 regarding P108740EP00/FWW, Application No. 07113532.1-2412/1890443.

\* cited by examiner

SYSTEM AND METHOD FOR IMPLEMENTING A MULTI-RADIO WIRELESS NETWORK

RELATED APPLICATIONS

This application claims priority to U.S. Patent Application Ser. No. 60/822861, entitled "MANAGING A WIRELESS NETWORK," which was filed on Aug. 18, 2006.

TECHNICAL FIELD OF THE INVENTION

This invention relates in general to communication systems and, more particularly, to a system and method for implementing a multi-radio wireless network.

BACKGROUND OF THE INVENTION

While broadband network services and Voice over IP (VOIP) products continue to grow and expand, so does the demand for wireless network functionality. To help meet this demand networks are being developed that use multiple base stations, relay stations, access points or points of contact. One emerging technology is 802.16, popularly known as WiMAX. WiMAX provides broadband wireless access, with a single base station providing coverage over a large area (theoretically up to 31 miles). Other wireless networking technologies include Third Generation (3G), Third Generation Partnership Project (3GPP), and 802.11, popularly known as WiFi.

An endpoint's ability to enjoy the benefits of wireless networks, such as WiMAX, depends on its ability to locate and lock onto a strong enough signal. This can often be difficult in areas where the signal from the base station encounters interference (e.g., at the edge of its range, in areas where the coverage of two bases stations overlap, within a tunnel or building). One possible solution is to increase the transmission power of the base station; another solution is to install additional base stations. However, this may not be desirable because of the increased operating costs and the limited access to backhaul links. Another solution is 802.16j which is being developed by the 802.16j Relay Working Group as part of the 802.16 standard. 802.16j provides a way to implement relay stations that may increase the service area and/or throughput abilities of a WiMAX base station. The relay stations do not need a backhaul link because they communicate wirelessly with both base stations and endpoints. This type of network may be referred to as a multihop network because there may be more than one wireless connection between the endpoint and a hardwired connection.

As may be apparent, communicating wirelessly with both base stations and endpoints increases the amount of data that the relay station must communicate. More specifically, the relay station both receives and then transmits the same data between the endpoint and the base station using wireless connections. A relay station within the wireless network may often only use a single channel to provide its communication needs with both the endpoints and the other relay stations and base stations. The capacity of this channel is finite and in some situations may be insufficient to support the traffic demands within a particular relay station's cell.

SUMMARY

Particular embodiments provide a system and method for implementing a multi-radio wireless network that substantially eliminates or reduces at least some of the disadvantages and problems associated with previous methods and systems.

In accordance with a particular embodiment, a system for implementing a multi-radio wireless network includes a plurality of endpoints wirelessly coupled to a relay station. The system also includes a base station wirelessly coupled to the relay station. The relay station includes a first radio operable to use a first channel to communicate with the base station. The relay station also includes a second radio operable to use a second channel to communicate with the plurality of endpoints. The relay station further includes a processor coupled to the first radio and the second radio. The processor is operable to relay data between the base station and the plurality of endpoints.

In particular embodiments, the first radio may be further operable to receive a first frame from the base station. The first frame may include a first preamble and a first downlink and uplink map. Furthermore, the second radio may be further operable to send a second frame to the plurality of endpoints. The second frame may include a second preamble and a second downlink and uplink map. The second frame sent to the plurality of endpoints may be independent of the first frame received from the base station.

In some embodiments the first radio may be an endpoint style radio and the second radio may be a base station style radio. In particular embodiments the wireless network may include an 802.16 Worldwide Interoperability for Microwave Access (WiMAX) wireless network.

In accordance with another embodiment, a method for implementing a multi-radio wireless network includes wirelessly coupling a base station to a relay station. The relay station uses a first radio having a first channel associated thereto to communicate with the base station. The method also includes wirelessly coupling a plurality of endpoints to the relay station. The relay station uses a second radio having a second channel associated thereto to communicate with the plurality of endpoints. The method further includes relaying data between the base station and the plurality of endpoints using the first radio and the second radio.

Technical advantages of particular embodiments include using two different style radios, a base station style radio and an endpoint style radio. Accordingly, the cost of a multi-radio relay station is reduced through the use of existing types of radios. Another technical advantage of particular embodiments is that one radio can receive while another radio transmits. Accordingly, data can be relayed from one device to the next without having to wait for a radio to transition form a receive state to a transmit state.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
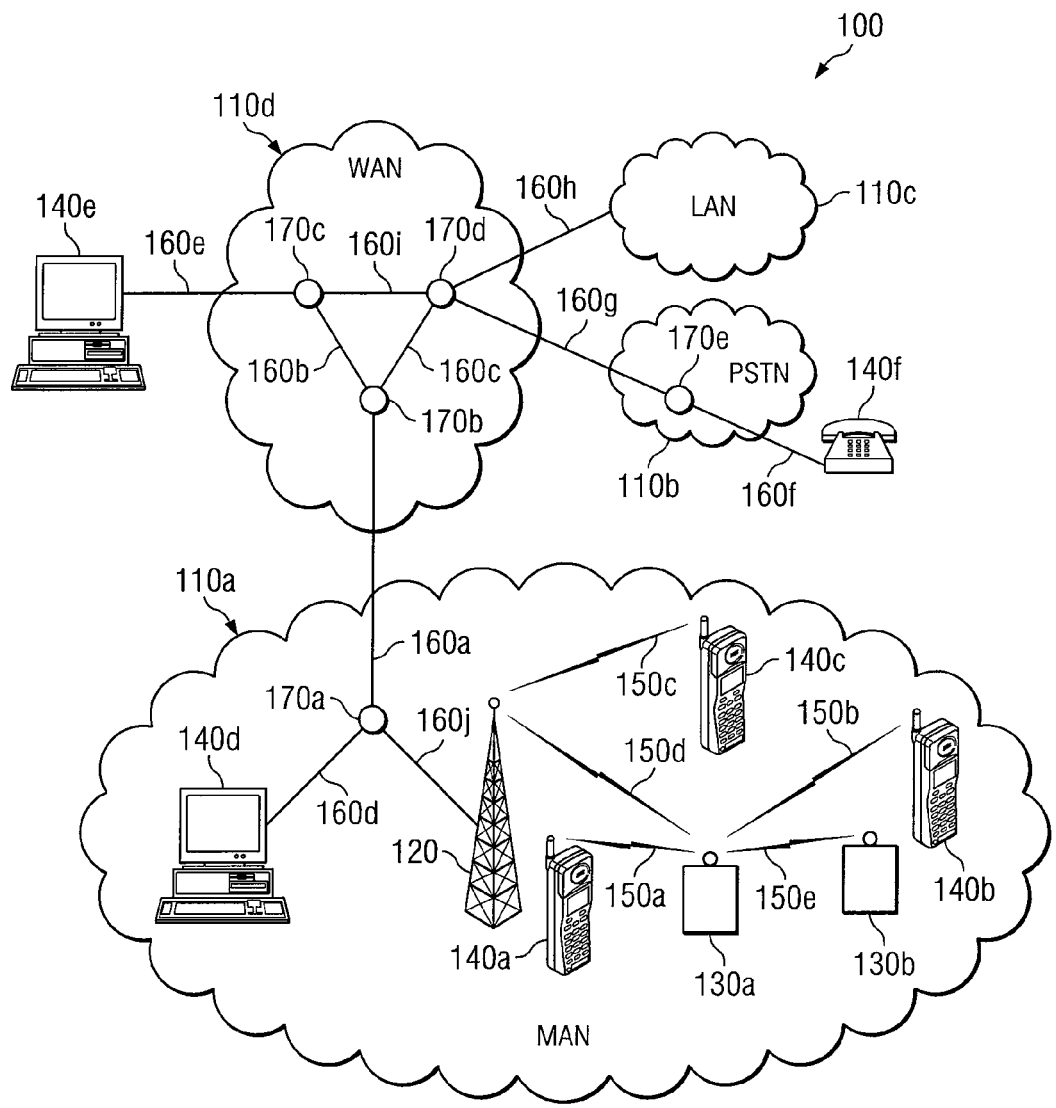
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VOIP) calls, video over IP calls, or any other type of functionality typically provided by a network. Networks 110 may provide their respective services using any of a variety of protocols for either wired or wireless communication. For example, network 110a may comprise an 802.16 wireless network, popularly known as WiMAX, which may include base stations (e.g., base station 120) and relay stations (e.g., relay stations 130). Network 110a may provide for the use of relay stations 130 by implementing 802.16j. A WiMAX network that uses relay stations may be referred to as a mobile multihop relay (MMR) network.

In particular embodiments, it may be desirable for relay stations 130 to comprise multiple radios that may each have a different channel associated therewith. For example, relay station 130a may comprise one radio that may be similar to a radio used by an endpoint. This endpoint style radio may be used to establish wireless connection 150d for transmitting/receiving data to/from base station 120. The routine involved in establishing wireless connection 150d with base station 120 may be similar to the routine a typical endpoint (e.g., endpoint 140c) may use in establishing a wireless connection with base station 120. Relay station 130a may also comprise another radio that may be similar to a radio used by base station 120. This base station style radio may be used to establish wireless connections 150a, 150b, and 150e with endpoints 140a, 140b and relay station 130b, respectively, for transmitting/receiving data to/from relay station 130a. The routine involved in establishing wireless connections 150a, 150b, and 150e with endpoints 140a, 140b and relay station 130b, respectively, may be similar to the routine a typical base station (e.g., base station 120) may use in establishing a wireless connection with an endpoint (e.g., endpoint 140c). Each radio may be capable of establishing several wireless connections 150 with other base stations, relay stations and/or endpoints using different subchannels. Because relay stations 130 may use different channels than base station 120 there is greater flexibility in how wireless resources are assigned within network 110a.

Although communication system 100 includes four networks 110a-110d, the term "network" should be interpreted as generally defining any network capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wireline networking.

Generally, networks 110a, 110c, and 110d provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110a may be a MAN implemented, at least in part, via WiMAX, network 110b may be a PSTN, network 110c may be a LAN, and network 110d may be a WAN.

Networks 110a, 110c and 110d may be IP networks. IP networks transmit data by placing the data in packets and sending each packet individually to the selected destination, along one or more communication paths. Network 110b is a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b or 110d (e.g., nodes 170e or 170c may comprise a gateway). The gateway may allow PSTN 110d to be able to communicate with non-PSTN networks such as networks 110a, 110c and 110d.

Any of networks 110a, 110c and/or 110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a, 110c and/or 110d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

Wireless connections 150 may represent a wireless connection between two components using, for example, WiMAX. The extended range of a WiMAX base station and/or relay station may allow network 110a to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160a, communicate with other base stations, network components not capable of establishing a wireless connection, and/or with other networks outside of the MAN, such as network 110d or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170a may comprise another base station that is wired to base station 120 via link 160j and to network 110d via link 160a. As a base station, node 170a may be able to establish several wireless connections with various other base stations, relay stations, and/or endpoints. As another example, node 170e may comprise a gateway. This may allow network 110b, a PSTN network, to be able to transmit and receive communications from other non-PSTN networks, such as network 110d, an IP network. Node 170e, as a gateway, works to translate communications between the various protocols used by different networks.

Endpoints 140 and/or nodes 170 may comprise any combination of hardware, software, and/or encoded logic that provides data or network services to a user. For example, endpoints 140a-140c may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals. Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
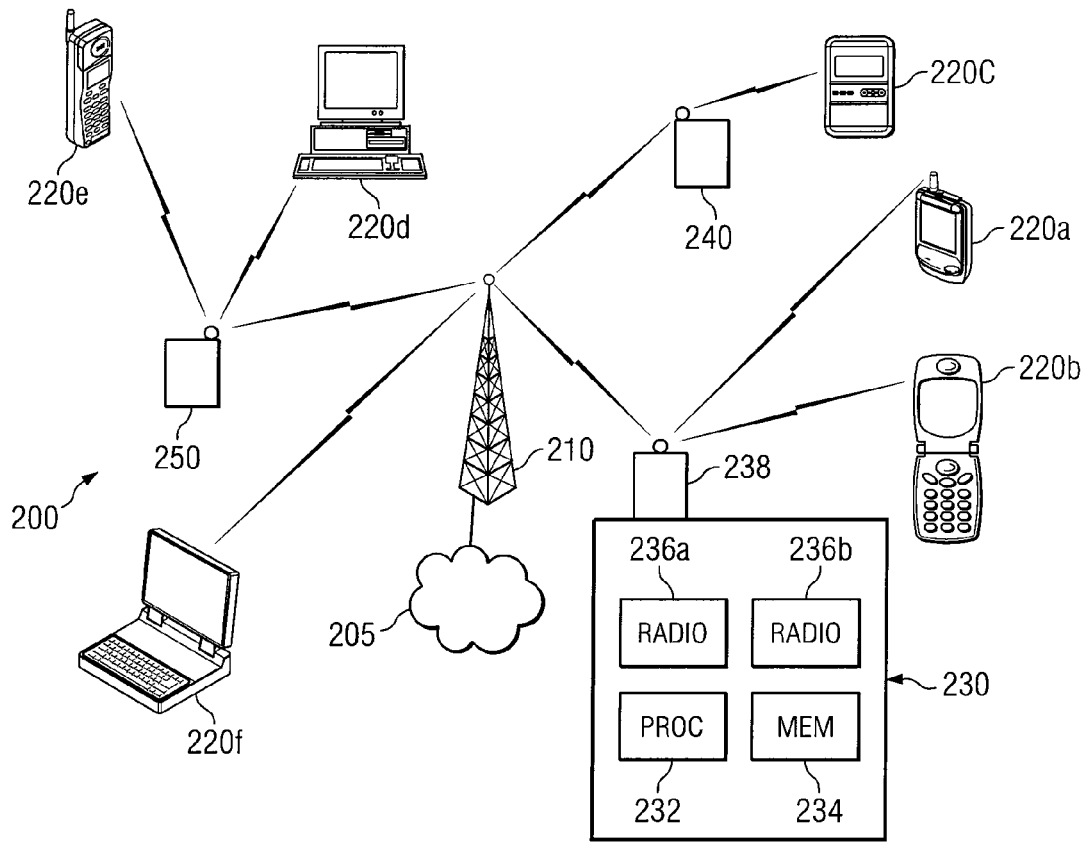
FIG. 2 illustrates a wireless network comprising a more detailed view of a relay station, in accordance with a particular embodiment.

FIG. 2 illustrates wireless network 200 comprising a more detailed view of relay station 230, in accordance with a particular embodiment. In different embodiments wireless network 200 may comprise any number of wired or wireless networks, base stations, endpoints, relay stations, and/or any other components that may facilitate or participate in the communication of data and/or signals whether via wired or wireless connections. For simplicity, wireless network 200 comprises network 205, base station 210, endpoints 220 and relay stations 230, 240 and 250. Furthermore, relay station 230 comprises processor 232, memory module 234, radios 236 and antenna 238. The components of relay station 230 may work together to provide relay station functionality, such as establishing wireless connections with both relay stations and endpoints of wireless network 200. In addition, network 205 may comprise one or more of the networks described above with respect to FIG. 1. For example, network 205 may comprise the Internet, a LAN, WAN, MAN, PSTN or some combination of the above.

In some embodiments, wireless network 200 may be analogized to a tree. For example, network 205 may be the roots; it contains the information and resources endpoints 220 may be using (e.g., a webpage, a VOIP service). Base station 210 may be the trunk; it provides relay stations 230, 240 and 250, and endpoints 220 with a secure backhaul link to network 205. Relay stations 230, 240 and 250 may be the branches; they extend the area from which endpoints can connect to base station 210. Endpoints 220 may be the leaves; there may be a relatively large number of them and they need to be connected to a branch (relay station) or the trunk (base station) to access the roots (network 205).

Base station 210 may be a WiMAX base station providing both wireless connections to endpoint 220f and relays stations 230, 240, and 250, and a wired connection to network 205. Through these connections, base station 210 may provide a wireless endpoint with access to various features, benefits, programs, or functionality of a wired connection. More specifically, base station 210 may receive, via a wireless connection, a request for certain data (e.g., a particular webpage) from endpoint 220f which base station 210 may then route to network 205. Network 205 may then return to base station 210 the requested data for endpoint 220f, which base station 210 may then pass to endpoint 220f via a wireless connection. Similar exchanges may take place between other components of wireless network 200. In some embodiments the exchange may take place using frames. A frame may comprise a downlink subframe used to send data and signals from base station 210, and an uplink subframe used to receive data and signals sent to base station 210.

As may be apparent, the larger the network the more scheduling and coordination that may be needed to implement the wireless connections efficiently. Base station 210 may be responsible for coordinating the wireless connections of wireless network 200. More specifically, in some embodiments, base station 210 may broadcast a preamble and a downlink and uplink map (hereinafter "DL/UL map") at the beginning of each frame. The preamble and DL/UL map may allow endpoints 220 and relay stations 230, 240, and 250 to synchronize with base station 210 and may provide them with information concerning which respective channel each of them is to use in communicating with base station 210. Relay stations 230, 240, and 250 may similarly send their own preamble and DL/UL map to synchronize with the respective endpoints 220 connected thereto. In a typical WIMAX environment using a single channel, the base station has to leave room within the downlink subframe for the relay stations to transmit their preambles and DL/UL maps. With a large network comprising several relay stations this may limit the amount of data the base station is able to transmit to the relay stations and may create significant overhead in attempting to schedule slots within the downlink subframe for each of them to transmit their preamble and DL/UL map. However, because relay stations 230, 240 and 250 may use multiple radios they may not need to coordinate their preambles and DL/UL maps with the preamble and DL/UL map of base station 210. For example, radio 236a of relay station 230 may use one channel (e.g., the channel used by base station 210) while radio 236b may use a different channel (e.g., the channel used by endpoint 220a). By allowing relay station 230 to send its preamble and DL/UL map on a different channel than base station 210, relay station 230 is able to send its preamble and DL/UL map when it is convenient for relay station 230, rather than having to coordinate it with base station 210's preamble and DL/UL map. This reduces scheduling overhead, increases the throughput of base station 210, and generally increases the flexibility with which base station 210 and relay stations 230, 240 and 250 communicate with endpoints 220. This may be possible because by using different channels there is no interference between base station 210 and relay stations 230, 240 or 250, thus allowing base station 210 to avoid having to schedule and/or provide slots for relay station 230 to send its preamble and DL/UL map. In particular embodiments, base station 210 may know not to schedule a slot for relay station 230 because, from the perspective of base station 210, relay station 230 is another endpoint and thus does not need to broadcast a preamble or DL/UL map.

It may now be advantageous to discuss the various components of relay station 230 in more detail, beginning with processor 232. It should be noted, that while only the components of relay station 230 are depicted, relay stations 240 and 250 may comprise similar components and may provide similar functionality. Processor 232 may be a microprocessor, controller, or any other suitable computing device, resource, or combination of hardware, software and/or encoded logic operable to provide, either alone or in combination with other relay station 230 components, such as memory module 234, relay station 230 functionality. Such functionality may include providing various wireless features discussed herein to an endpoint or base station, such as endpoints 220a, 220b, or base station 210. Processor 232 may be used in establishing wireless connections with base station 210 and endpoints 220a and 220b, as well as performing any necessary manipulation of data sent between, for example base station 210 and endpoint 220a.

Memory module 234 may be any form of volatile or non-volatile memory including, without limitation, magnetic media, optical media, random access memory (RAM), read-only memory (ROM), removable media, or any other suitable local or remote memory component. Memory module 234 may store any suitable data or information, including software and encoded logic, utilized by relay station 230. In some embodiments memory module 234 may store information concerning a secondary channel that relay station 230 may use to communicate with endpoints 220. Memory module 234 may also maintain a list, database, or other organization of data useful for determining how to route data to the proper endpoints, base stations and/or relay stations. For example, in some embodiments a tree structure (as opposed to a mesh structure) may be used in routing data from a base station to an endpoint. More specifically, there may be a known path from base station 210 to endpoint 220b. This path, or a portion thereof, may be stored in memory module 234.

Radios 236 may be coupled to or a part of antenna 238. Radios 236 may receive digital data from, for example, processor 232 that is to be sent out to other base stations, relay stations and/or endpoints via a wireless connection. Each radio 236 may be assigned its own channel which may be used, after converting the digital data into a radio signal having the appropriate channel, frequency, and bandwidth parameters, in sending/receiving data. The channel parameters may have been determined ahead of time by base station 210, or they may be determined by a combination of processor 232 and memory 234. The radio signal from each radio 236 may be transmitted via antenna 238 to the appropriate recipient (e.g., base station 210). For example, after processor 232 has processed data received from endpoint 220b via radio 236b, the data may be sent to base station 210 via radio 236a. Because two different radios are used, the delay between receiving the data from endpoint 220b and sending it to base station 210, may be reduced by at least the amount of time it would take for a single radio relay station to transition from receiving data to sending data.

Not only may the two radios of relay station 230 be assigned different channels as discussed above, but they may be different types of radios. More specifically, radio 236a may be an endpoint style radio used to communicate with base station 210, and radio 236b may be a base station style radio used to communicate with endpoints 220a and 220b. Thus, from the perspective of endpoint 220b, relay station 230 may appear to be a base station, and from the perspective of base station 210 relay station 230 may appear to be an endpoint. This may allow wireless network 200 to incorporate relay station 230, using its multiple radios, without having to change the way endpoints transmit or receive data. In some embodiments, the endpoint style radio used for radio 236a and/or the base station style radio used for radio 236b may be slightly modified from traditional endpoint style radios or base station style radios. For example, radio 236a may be an endpoint style radio in which the power has been increased to increase the distance from base station 210 that relay station 230 may be deployed. As another example, radio 236b may be a base station style radio in which the power has been decreased to decrease the cost and/or power consumption of operating relay station 230.

Antenna 238 may be any type of antenna capable of transmitting and receiving data and/or signals wirelessly. In some embodiments, antenna 238 may comprise one or more omni-directional, sector, or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Endpoints 220 may be any type of wireless endpoints able to send and receive data and/or signals to and from base station 210 or relay stations 230, 240 or 250. Some possible types of endpoints 240 may include desktop computers, PDAs, cell phones, laptops, and/or VoIP phones.

In order to better illustrate how these components may work together to provide some of the features of particular embodiments, the components of relay station 230 will be discussed within the context of an example. In this example, it may be assumed that when relay station 230 is first activated base station 210 has already been installed and activated. Thus, when relay station 230 is first activated it may initiate network entry in a manner similar to the manner in which endpoint 220f may initiate network entry. More specifically, relay station 230 may use endpoint style radio 236a to send, via antenna 238, the appropriate endpoint signaling to initiate network entry with base station 210. This may be done using the same channel that base station 210 uses in communicating with all the other components connected directly thereto. For simplicity, the channel used for communications between base station 210 and relay station 230 may be referred to as the primary channel.

Once relay station 230 has completed its initiation with base station 210, processor 232 may request a secondary channel. The secondary channel may be different than the primary channel (e.g., may comprise a different center frequency or bandwidth). In some embodiments, relay station 230 may request the secondary channel by sending a request over the primary channel to base station 210. In particular embodiments, relay station 230 may request the secondary channel from memory 234 by loading preconfigured channel information for the secondary channel stored within memory 234.

The secondary channel may be used by base station-style radio 236b to communicate with endpoints 220a and 220b. Thus, from the perspective of endpoints 220a and 220b, relay station 230 appears to be another base station. This may allow endpoints 220a and 220b to be able to communicate with relay station 230 without having to modify the signaling between endpoints 220 and relay station 230 or the way endpoints 220 send/receive data.

Having received the appropriate channel information for base station-style radio 236b, processor 232 may generate a preamble and DL/UL map for those endpoints that may be connected thereto. Because relay station 230 may be viewed by endpoints 220a and 220b as a base station, the preamble and DL/UL map generated by processor 232 may be functionally similar to the preamble and DL/UL map generated by a base station. Furthermore, because base station-style radio 236b is operating on a different channel than endpoint style radio 236a, processor 232 may generate the preamble and DL/UL map and have them sent over the secondary channel whenever it is most advantageous to relay station 230. More specifically, relay station 230 does not have to wait for and/or coordinate with base station 210 in order to send its preamble and DL/UL map.

Like the preamble and DL/UL map sent by base station 210, the preamble and DL/UL map sent by relay station 230 may be used by endpoints 220a and 220b to synchronize with relay station 230. The preamble and DL/UL map may contain information endpoints 220 may use to configure their radio to the appropriate channel to avoid interference with other endpoints. Once synchronized, endpoints 220a and 220b may be able to communicate with relay station 230 as though it were a base station. More specifically, a bandwidth request sent to relay station 230 may be similar to a bandwidth request sent to a base station, such as base station 210. Communications (e.g., signaling or data) from endpoints 220a and 220b may be received by antenna 238 and then passed to radio 236b which may translate them from a radio signal to digital data that can be processed by processor 232. Processor 232 may edit some of the routing information before sending the digital data on to radio 236a to be converted into a radio signal and sent to base station 210 via antenna 238. A similar, though reversed, transaction may occur for data being sent from base station 210 to one of endpoints 220a or 220b.

Because relay station 230 includes two radios utilizing different channels there may be less delay from when relay station 230 first receives the data and when it is sent on. More specifically, using two separate radios may eliminate the delay associated with single radio relay stations as the single relay station attempts to transition the radio from receiving data from the endpoint to transmitting data to the base station. Furthermore, the use of two different channels allows relay station 230 more flexibility in scheduling data bursts between endpoints 220a and 220b. More specifically, processor 232 may determine the best time for relay station 230 to send its preamble and DL/UL map as opposed to being limited to the slot allocated by base station 210.

In some situations, there may not be enough channels available for a unique channel to be assigned to each relay station. In such a situation, base station 210 and one or more of relay stations 230, 240 and/or 250 may share a common channel. In doing so base station 210 may divide both its downlink and uplink subframes into two zones. More specifically, the downlink subframe may comprise a first zone to be used by base station 210 to send data and a second zone to be used by relay stations 230, 240 and/or 250 to send data; similarly the uplink subframe may comprise a third zone to be used by base station 210 to receive data and a fourth zone to be used by relay stations 230, 240 and/or 250 to receive data. Furthermore, it may be that the first and third zones used by base station 210 may be partial usage of subchannel (PUSC) zones with non-adjacent subcarrier permutation and the second and fourth zones used by relay stations 230, 240 and/or 250 may be adaptive modulation coding (AMC) zones with adjacent subcarrier permutation.

Because the first and second zones may be different (e.g., PUSC vs. AMC) it may be desirable for base station 210 to include a zone switch information element (IE) in the DL/UL map sent at the beginning of the frame. For example, the zone switch IE may comprise a Space-Time Coding(STC)/DL-_Zone switch IE or uplink zone switch IE. The zone switch IE may instruct relay stations 230, 240 and/or 250 as to the zone allocated thereto. In particular embodiments, the zone switch IEs carried in base station 210's DL/UL map may only be meaningful to relay stations 230, 240, and 250, and endpoint 220f, but irrelevant to endpoints 220a-220e because they have established connections with relay stations 230, 240 or 250. Furthermore, in particular embodiments, relay stations 230, 240 and/or 250 do not need to repeat the zone switch IEs in their DL/UL map which they send to their respective endpoints. In particular embodiments, it may be desirable for each sub-zone to contain adjacent subcarriers. In some embodiments, adjacent subcarrier permutations may be used to indicate the subcarrier allocation in the second and fourth zones being shared by the relay stations.

Were more than one relay station to be sharing the second and fourth zones, the second and fourth zones may comprise several sub-zones with each sub-zone being associated with a different relay station. The sub-zones may be used by each relay station to communicate with any endpoints connected thereto. More specifically, relay station 240 may be assigned to a separate sub-zone from relay station 250 thus allowing relay stations 240 and 250 to operate independently of each other. Furthermore, each relay station may use any permutation in its own sub-zone to communicate with the endpoints under its service. For example, relay station 250 may use a PUSC permutation in the beginning of its frame to transmit its preamble. Furthermore, each relay station may divide its respective sub-zone into separate sub-channels for each endpoint connected thereto. For example, the channel used by base station 210 in the first and the third zones may have a larger channel bandwidth and different centering frequency compared to the channels used by relay station 250 in the second and fourth zones.

Thus far several different embodiments and features have been presented. Particular embodiments may combine one or more of these features depending on operational needs and/or component limitations. This allows for great adaptability of wireless network 200 to the needs of various organizations and users. For example, a particular embodiment may use several base stations to provide wireless access for a metropolitan area, or a single base station may be used with several relay stations providing the necessary coverage.

Figure 3:
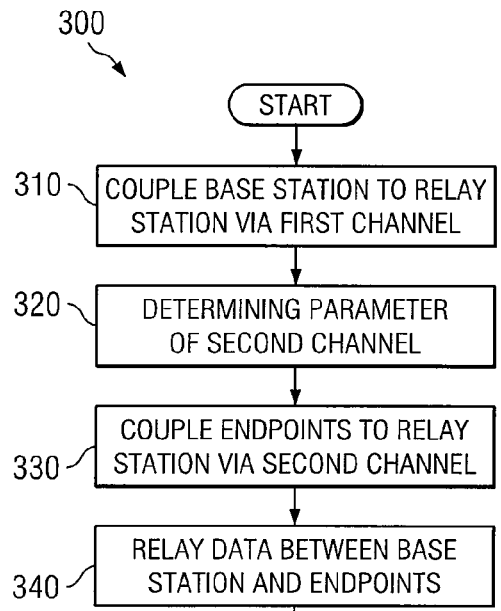
FIG. 3 illustrates a method for implementing a multi-radio wireless network, in accordance with a particular embodiment.

FIG. 3 illustrates a method for implementing a multi-radio wireless network, in accordance with a particular embodiment. The illustrated method allows, among other things, for a relay station to be able to communicate with a base station using one radio and with several endpoints using a different radio. Because the relay station is using different radios, it may be able to use different channels. The use of different radios and different channels may increase the bandwidth available to the base station, reduce the overhead of scheduling slots for the relay station to send its preamble and DL/UL map, and provide more flexibility to the relay station in how it communicates with the endpoints connected thereto.

The method begins at step 310 where a base station is wirelessly coupled to a relay station via a first channel. The relay station may comprise two separate radios, a first radio and a second radio. Each of the two radios may be able to communicate independently of the other radio using its own channel. In coupling the base station to the relay station, the relay station may use its first radio with a first channel associated therewith. The first channel may be used by the base station and the relay station to send data and signaling information between each other. For example, in some embodiments, the relay station may use the first channel to send the base station a request for information concerning channel parameters for a second channel to be used with the relay station's second radio. Similarly, the base station may use the first channel to reply with the requested channel parameters. As another example, once the relay station and the base station have been wirelessly coupled, the relay station may begin to receive, via the first channel, frames of data from the base station. Each frame may begin with a preamble and a DL/UL map which may be used to synchronize the two devices.

The next step in the method is step 320 where the relay station determines the parameters for a second channel. In particular embodiments, the relay station may determine the parameters of the second channel using information received from the base station as discussed above. In some embodiments, the relay station may already have the information needed to determine the parameters of the second channel stored internally. For example, the relay station may be preconfigured with the information needed to determine the parameters of the second channel.

The parameters of the second channel may be used in configuring the relay station's second radio. At step 330 one or more endpoints may be coupled to the relay station via the second channel. Similar to the first channel, the second channel may be used to wirelessly communicate data and/or signaling between the endpoints and the relay station. For example, the relay station may send its own preamble and DL/UL map to the endpoints so that the endpoints can synchronize with the relay station. Because there may be more than one endpoint, the relay station may divide the second channel into as many sub-channels as there are endpoints, thus allowing each endpoint to have its own sub-channel. The information regarding which sub-channel each endpoint may use may be contained within the preamble and DL/UL map sent by the relay station via the second channel.

In particular embodiments, the two radios used by the relay station may be different. More specifically, the first radio used to communicate with the base station may be an endpoint style radio and the second radio used to communicate with the endpoints may be a base station style radio. This may allow the relay station to communicate with the base station as though it were an endpoint and with the endpoints as though it were a base station. Because the two radios may be different, and may have different channels associated therewith, it may be possible for the relay station to send its preamble and DL/UL map independently of when the base station sends its preamble and DL/UL map.

Once the relay station has been wirelessly coupled to both the base station and the endpoints, it may be possible for the relay station to then relay data sent from the base station to the appropriate endpoint and to relay data from any of the endpoints to the base station. This is done at step 340. In particular embodiments this may involve receiving the data from, for example, the base station via the first channel, and then buffering the data before it is processed and then sent to the appropriate endpoint via the second channel. Because the relay station has two different radios using two different channels, the data may be quickly sent from one radio to the next without having to wait for a radio to change from a receive state to a send state as may be required in a single radio relay station.

Some of the steps illustrated in FIG. 3 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A system for implementing a multi-radio wireless network, comprising:
a plurality of endpoints wirelessly coupled to a relay station;
a base station wirelessly coupled to the relay station; and
the relay station comprising:
an endpoint style radio operable to use a first channel to communicate with the base station wherein the endpoint style radio is further operable to receive a first frame from the base station, the first frame comprising timing information, a first preamble, and a first downlink and uplink map;
a base station style radio operable to use a second channel to directly communicate with the plurality of endpoints wherein the base station style radio is further operable to transmit a second frame to the plurality of endpoints, the second frame comprising a second preamble and a second downlink and uplink map, wherein the base station style radio is operable to transmit the second frame to the plurality of endpoints such that a transmission timing of the transmission of the second frame to the plurality of endpoints is independent of the timing information provided by the first frame received from the base station; and
a processor coupled to the endpoint style radio and the base station style radio and operable to relay data between the base station and the plurality of endpoints.

2. The system of claim 1, wherein the wireless network comprises an 802.16 Worldwide Interoperability for Microwave Access (WiMAX) wireless network.

3. The system of claim 1, wherein the processor operable to relay data between the base station and the plurality of endpoints is further operable to:
receive the data from the base station and the plurality of endpoints;
buffer the data from the base station and the plurality of endpoints;
process the data from the base station and the plurality of endpoints; and
relay the processed data between the base station and the plurality of endpoints.

4. The system of claim 1, wherein the endpoint style radio is further operable to send a request to the base station for at least one parameter of the second channel.

5. The system of claim 1, wherein the processor is further operable to determine at least one parameter of the second channel.

6. The system of claim 1, wherein the second channel comprises a sub-channel of the first channel.

7. The system of claim 6, wherein the first channel and the second channel are separated by a zone switch information element (IE), the zone switch IE marking the boundary between a first zone used by the base station as the first channel and a second zone used by the relay station as the second channel.

8. The system of claim 1, wherein, during at least a portion of time, the endpoint style radio uses the first channel to communicate with the base station while the base station style radio concurrently uses the second channel to directly communicate with the plurality of endpoints.

9. The system of claim 1, wherein:
the endpoint style radio comprises an endpoint radio operable to be used in an endpoint and to use an endpoint routine for establishing a first wireless connection with the base station; and
the base station style radio comprises a base station radio operable to be used in a base station and to use a base station routine for establishing a second wireless connection with the plurality of endpoints.

10. A method for implementing a multi-radio wireless network, comprising:
wirelessly coupling a base station to a relay station, the relay station using an endpoint style radio having a first channel associated thereto to communicate with the base station;
wirelessly coupling a plurality of endpoints to the relay station, the relay station using a base station style radio having a second channel associated thereto to directly communicate with the plurality of endpoints; and
relaying data between the base station and the plurality of endpoints using the endpoint style radio and the base station style radio;
wherein relaying data comprises:
receiving a first frame from the base station, the first frame comprising timing information, a first preamble, and a first downlink and uplink map; and
transmitting a second frame to the plurality of endpoints, the second frame comprising a second preamble and a second downlink and uplink map, wherein a transmission timing of the transmission of the second frame to the plurality of endpoints is independent of the timing information provided by the first frame received from the base station.

11. The method of claim 10, wherein the wireless network comprises an 802.16 Worldwide Interoperability for Microwave Access (WiMAX) wireless network.

12. The method of claim 10, wherein relaying data between the base station and the plurality of endpoints using the endpoint style radio and the base station style radio further comprises:
receiving the data from the base station and the plurality of endpoints;
buffering the data from the base station and the plurality of endpoints;
processing the data from the base station and the plurality of endpoints; and
relaying the processed data between the base station and the plurality of endpoints.

13. The method of claim 10, further comprising sending a request to the base station for at least one parameter of the second channel.

14. The method of claim 10, further comprising determining at least one parameter of the second channel.

15. The method of claim 10, wherein the second channel comprises a sub-channel of the first channel.

16. The method of claim 15, wherein the first channel and the second channel are separated by a zone switch information element (IE), the zone switch IE marking the boundary between a first zone used by the base station as the first channel and a second zone used by the relay station as the second channel.

17. The method of claim 10, wherein, during at least a portion of time, the relay station uses the endpoint style radio to communicate with the base station using the first channel while also concurrently using the base station style radio to directly communicate with the plurality of endpoints using the second channel.

18. The method of claim 10, wherein:
the endpoint style radio comprises an endpoint radio operable to be used in an endpoint and to use an endpoint routine for establishing a first wireless connection with the base station; and
the base station style radio comprises a base station radio operable to be used in a base station and to use a base station routine for establishing a second wireless connection with the plurality of endpoints.

19. Logic encoded in a non-transitory computer readable medium that when executed is operable to:
wirelessly couple a base station to a relay station, the relay station using endpoint style radio having a first channel associated thereto to communicate with the base station;
wirelessly couple a plurality of endpoints to the relay station, the relay station using a base station style radio having a second channel associated thereto to directly communicate with the plurality of endpoints; and
relay data between the base station and the plurality of endpoints using the endpoint style radio and the base station style radio;
wherein the logic operable to relay data is further operable to:
receive a first frame from the base station, the first frame comprising timing information, a first preamble, and a first downlink and uplink map; and
transmit a second frame to the plurality of endpoints, the second frame comprising a second preamble and a second downlink and uplink map, wherein a transmission timing of the transmission of the second frame transmitted to the plurality of endpoints is independent of the timing information provided by the first frame received from the base station.

20. The medium of claim 19, wherein the wireless network comprises an 802.16 Worldwide Interoperability for Microwave Access (WiMAX) wireless network.

21. The medium of claim 19, wherein the logic operable to relay data between the base station and the plurality of endpoints using the endpoint style radio and the base station style radio comprises code operable to:
receive the data from the base station and the plurality of endpoints;
buffer the data from the base station and the plurality of endpoints;
process the data from the base station and the plurality of endpoints; and
relay the processed data between the base station and the plurality of endpoints.

22. The medium of claim 19, wherein the logic is further operable to send a request to the base station for at least one parameter of the second channel.

23. The medium of claim 19, wherein the logic is further operable to determine at least one parameter of the second channel.

24. The medium of claim 19, wherein the second channel comprises a sub-channel of the first channel.

25. The medium of claim 24, wherein the first channel and the second channel are separated by a zone switch information element (IE), the zone switch IE marking the boundary between a first zone used by the base station as the first channel and a second zone used by the relay station as the second channel.

26. The medium of claim 19, wherein, during at least a portion of time, the endpoint style radio uses the first channel to communicate with the base station while the base station style radio concurrently uses the second channel to directly communicate with the plurality of endpoints.

27. The medium of claim 19, wherein:
the endpoint style radio comprises an endpoint radio operable to be used in an endpoint and to use an endpoint routine for establishing a first wireless connection with the base station; and
the base station style radio comprises a base station radio operable to be used in a base station and to use a base station routine for establishing a second wireless connection with the plurality of endpoints.

28. A system for implementing a multi-radio wireless network, comprising:
means for wirelessly coupling a base station to a relay station, the relay station using an endpoint style radio having a first channel associated thereto to communicate with the base station;
means for wirelessly coupling a plurality of endpoints to the relay station, the relay station using a base station style radio having a second channel associated thereto to directly communicate with the plurality of endpoints; and
means for relaying data between the base station and the plurality of endpoints using the endpoint style radio and the base station style radio;
wherein the means for relaying data comprises:
means for receiving a first frame from the base station, the first frame comprising timing information, a first preamble, and a first downlink and uplink map; and
means for transmitting a second frame to the plurality of endpoints, the second frame comprising a second preamble and a second downlink and uplink map, wherein a transmission timing of the transmission of the second frame transmitted to the plurality of endpoints is independent of the timing information provided by the first frame received from the base station.

* * * * *